United States Patent
Keyes et al.

(10) Patent No.: US 10,294,855 B2
(45) Date of Patent: May 21, 2019

(54) TRANSITIONAL TURBULATOR

(71) Applicant: GM Global Technology Operations LLC, Detroit, MI (US)

(72) Inventors: Jared J. Keyes, Farmington Hills, MI (US); Andrew G. Morse, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 15/496,414

(22) Filed: Apr. 25, 2017

(65) Prior Publication Data

US 2018/0306101 A1    Oct. 25, 2018

(51) Int. Cl.
*F02M 15/00* (2006.01)
*F02B 29/04* (2006.01)

(52) U.S. Cl.
CPC ......... *F02B 29/0456* (2013.01); *Y02T 10/146* (2013.01)

(58) Field of Classification Search
CPC .................................................. F02B 29/0456
USPC ........................................................ 123/542
See application file for complete search history.

(56) References Cited

U.S. PATENT DOCUMENTS

| | | | | |
|---|---|---|---|---|
| 4,501,321 A | * | 2/1985 | Real | F28D 9/0031 138/157 |
| 4,645,000 A | * | 2/1987 | Scarselletta | F28D 1/05366 165/152 |
| 4,798,241 A | * | 1/1989 | Jarrett | B01F 5/0614 138/38 |
| 6,793,012 B2 | * | 9/2004 | Fang | F28D 1/0443 165/140 |
| 7,686,070 B2 | * | 3/2010 | Chu | F28D 1/0316 165/109.1 |
| 2004/0216863 A1 | * | 11/2004 | Hu | F28D 1/0443 165/110 |
| 2005/0257921 A1 | * | 11/2005 | Hu | F28D 1/0443 165/140 |
| 2006/0113068 A1 | * | 6/2006 | Desai | F28D 1/0417 165/140 |
| 2007/0119576 A1 | * | 5/2007 | Agee | F28D 7/0041 165/109.1 |
| 2007/0137841 A1 | * | 6/2007 | Bjork | F28F 1/126 165/153 |

(Continued)

FOREIGN PATENT DOCUMENTS

EP    2937660    * 10/2015    ............. F28F 13/06

OTHER PUBLICATIONS

U.S. Appl. No. 15/423,099, filed Feb. 2, 2017, Jeffrey S. Davis et al.

*Primary Examiner* — Hung Q Nguyen
*Assistant Examiner* — Anthony Donald Taylor, Jr.

(57) ABSTRACT

An air-to-air charge air cooler for cooling air supplied to an internal combustion engine includes a tube assembly including a plurality of tubes extending in a longitudinal direction. The plurality of tubes is arranged adjacent to one another. Each of the plurality of tubes includes an inlet to receive airflow and an outlet to output airflow. A turbulator is arranged in at least one of the plurality of tubes, the turbulator having a pitch defined in a direction transverse to airflow through the tube. The pitch varies in at least one of a longitudinal direction and a transverse direction of the tube.

9 Claims, 3 Drawing Sheets

(56) References Cited

U.S. PATENT DOCUMENTS

| | | | | |
|---|---|---|---|---|
| 2009/0133860 A1* | 5/2009 | Harada | ............... | F28D 1/05366 |
| | | | | 165/151 |
| 2010/0108042 A1* | 5/2010 | Akiyoshi | ............. | B23K 1/0012 |
| | | | | 123/568.12 |
| 2011/0240270 A1* | 10/2011 | Hisanaga | .............. | F28D 7/1684 |
| | | | | 165/151 |
| 2012/0205086 A1* | 8/2012 | Nakamura | ............ | H01L 23/473 |
| | | | | 165/181 |
| 2013/0263829 A1* | 10/2013 | Demots | .................. | F02M 31/20 |
| | | | | 123/563 |
| 2014/0216367 A1* | 8/2014 | Norman | .................... | F01P 1/00 |
| | | | | 123/41.02 |
| 2016/0319671 A1* | 11/2016 | Benson | ..................... | F01D 5/18 |
| 2017/0152815 A1* | 6/2017 | Peters | .................... | F02M 26/29 |

\* cited by examiner

TRANSITIONAL TURBULATOR

CROSS-REFERENCE TO RELATED APPLICATIONS

This application is related to U.S. patent application Ser. No. 15/423,099 filed on Feb. 2, 2017. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to heat exchangers, and more particularly to an air-to-air charge air cooler (CAC).

Vehicles use engines with turbochargers to increase power and reduce fuel consumption. A heat exchanger such as an air-to-air charge air cooler ("CAC") is often used to cool compressed air generated by the turbocharger before the compressed air is fed into an intake manifold of the engine. Cooling of the compressed air increases the density of the air, which increases the efficiency of the engine.

SUMMARY

An air-to-air charge air cooler for cooling air supplied to an internal combustion engine includes a tube assembly including a plurality of tubes extending in a longitudinal direction. The plurality of tubes is arranged adjacent to one another. Each of the plurality of tubes includes an inlet to receive airflow and an outlet to output airflow. A turbulator is arranged in at least one of the plurality of tubes. The turbulator has a pitch defined in a direction transverse to airflow through the tube. The pitch varies in at least one of a longitudinal direction and a transverse direction of the tube.

In other features, the at least one of the plurality of tubes includes a first turbulator having a first pitch and a second turbulator having a second pitch that is different than the first pitch. The first turbulator is arranged adjacent to the second turbulator in the transverse direction in the tube.

In other features, the first turbulator extends from the inlet to the outlet. The second turbulator extends from the inlet to the outlet. The first pitch is in a range from 0.5 to 3 times the second pitch. The first pitch is in a range from 0.5 to 6 and the second pitch is in a range from 0.5 to 3.5.

In other features, the at least one of the plurality of tubes includes a first turbulator having a first pitch and a second turbulator having a second pitch that is different than the first pitch. The first turbulator is arranged adjacent to the second turbulator in the longitudinal direction in the tube. The first pitch is in a range from 0.5 to 3 times the second pitch. The first pitch is in a range from 0.5 to 6 and the second pitch is in a range from 0.5 to 3.5.

In other features, the at least one of the plurality of tubes includes a first longitudinal portion and a second longitudinal portion. A first turbulator having a first pitch is arranged in the first longitudinal portion. A second turbulator that is arranged in the second longitudinal portion has a second pitch that is different than the first pitch.

In other features, a first end of the first longitudinal portion is arranged adjacent to the inlet, a second end of the first longitudinal portion is arranged adjacent to a first end of the second longitudinal portion, and a second end of the second longitudinal portion is arranged adjacent to the outlet. The first pitch is in a range from 0.5 to 3 times the second pitch. The first pitch is in a range from 0.5 to 6 and the second pitch is in a range from 0.5 to 3.5.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
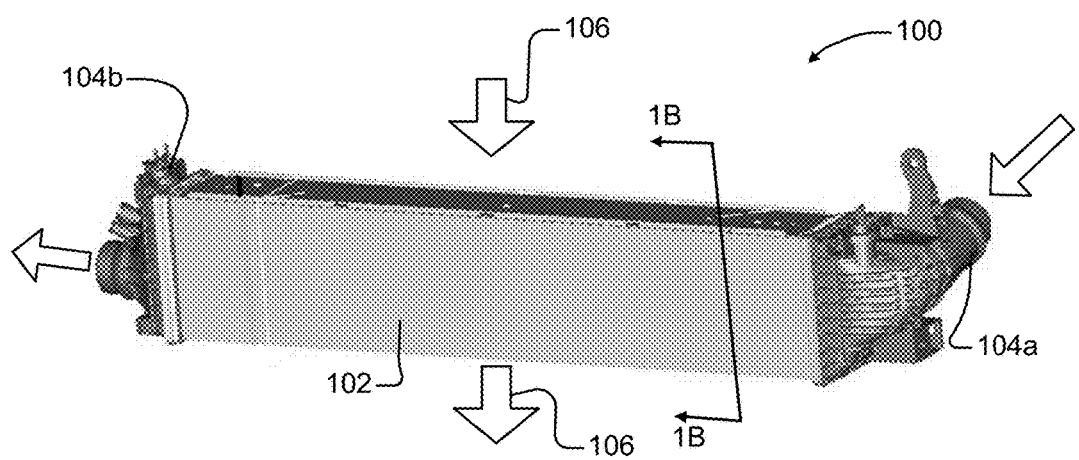
FIGS. 1A and 1B are perspective views of an air-to-air CAC including a tube assembly including a plurality of tubes with one or more turbulators having a variable pitch according to the present disclosure.

The CAC includes a tube assembly including a plurality of tubes through which the compressed air flows. The CAC is usually located in a position that allows ambient air to pass over the tube assembly as the vehicle is driven. One or more turbulators may be disposed inside each of the tubes. In some examples, the turbulators may have a repeating structure such as an "S"-shaped cross-section, a "W"-shaped cross-section, other shaped cross-section or combinations thereof that define a pitch in a direction transverse to airflow though the tube assembly.

The turbulators are made of a heat conducting material such as metal and act as heat sinks to help dissipate heat from the compressed air produced by the turbocharger. The CAC may produce ice under certain load conditions where the ambient temp is below freezing and the car is running in steady state condition with very little boost from the turbo. Icing can freeze up the turbulators and sensors which can create a fault code and stall or reduce power to the engine.

The size of the CAC can be increased to increase cooling capacity. However, increasing the size of the CAC impacts surrounding components within the engine compartment due to the limited space available. A coolant-to-air heat exchanger system is another option for increasing cooling capacity. However, coolant-to-air heat exchangers are more costly, heavier than CAC type heat exchangers, and often involve more components than air-to-air CACs.

Under certain conditions, the dew point of the internal air portion of the CAC can form water droplets which can collect in the turbulators and at some point collect or be blown into the intake. Water flowing into the manifold chokes the engine, causes stalling or reduces power, and may set diagnostic fault codes. One way to reduce icing and condensation in the CAC is to reduce the density of the internal turbulator so that the dew point is increased to the point that water cannot condensate. By reducing the density of the turbulator, icing is less likely to occur since the CAC cooling capacity and performance is reduced.

The reduction of the turbulator density corrects two problems but creates a lower power CAC that may not meet engine performance requirements. Therefore, another approach needs to be used to still have the benefit of reducing CAC icing and condensation, and still keep the performance of the CAC.

The CAC according to the present disclosure uses multiple density turbulators in the same CAC. The density can be varied by providing two or more densities in a longitudinal direction and/or a transverse direction. Lower pitch turbulators have higher airflow and lower pressure while higher pitch turbulators have higher pressure and lower airflow. Varying the pitch within the air-to-air CAC tubes helps to reduce the amount of water and/or icing.

In some examples, a higher density turbulator is located at the CAC inlet side and a lower density turbulator is located at the CAC outlet side. In this example, a majority of the cooling performance is enabled and most of the hotter charge air is cooled to a cooler temperature (but not too low to cause icing or below the dew point to cause condensation). If any of these two phenomena occur, the lower density turbulator allows the ice and water to move out of the turbulator area in the air stream to be slowly digested in the intake rather than cause a rush of water. This example configuration can also prevent ice from collecting on sensors and building up in the turbulator area and blocking the tubes.

In other examples, the turbulator is split into two or more densities in a transverse direction. This example configuration produces the same results described above for the longitudinal configuration. Under low load conditions, most of the CAC air takes the path of least resistance in the lower density turbulator. This in turn protects the CAC from icing and reaching the dew point. If the CAC causes icing or condensation, the lower density turbulator will push out the ice and water to be evenly consumed by the intake. During higher velocity airflow, both sides of the turbulator are taking in charge air and provide improved performance as compared to a CAC with only constant-density turbulator.

Figure 1B:
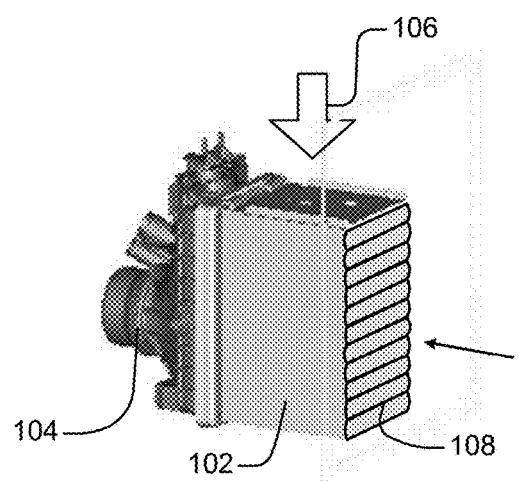

Referring now to FIGS. 1A and 1B, an air-to-air charge air cooler (CAC) 100 according to the present disclosure is shown. The air-to-air CAC 100 is used to cool air supplied to an intake manifold of an internal combustion engine of a motor vehicle. In FIG. 1A, the CAC 100 includes a tube assembly 102 including a plurality of longitudinal tubes 108 arranged adjacent to one another. An inlet structure 104*a* is associated with the tube assembly 102 for coupling to an external conduit or hose through which compressed air from a turbocharger is delivered to the CAC. An outlet structure 104*b* is attached to the tube assembly 102 through which the compressed air travelling through the CAC 100 is discharged to an intake manifold of the engine.

Hot compressed air from a turbocharger of the engine is directed into the CAC 100 and cooled in the CAC before being discharged. The cooling is achieved with the aid of ambient airflow 106 flowing around the CAC 100. In FIG. 1B, the tubes 108 are arranged adjacent to one another and each include one or more turbulators with variable transverse and/or longitudinal pitch as will be described further below.

Figure 2:
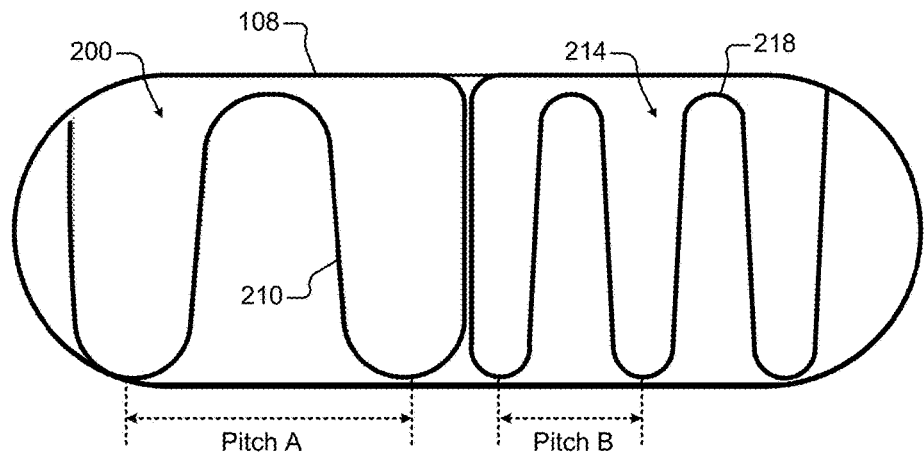
FIG. 2 is a cross-sectional view of an example of one of the tubes with a turbulator having variable pitch in a transverse direction according to the present disclosure.
Figure 3:
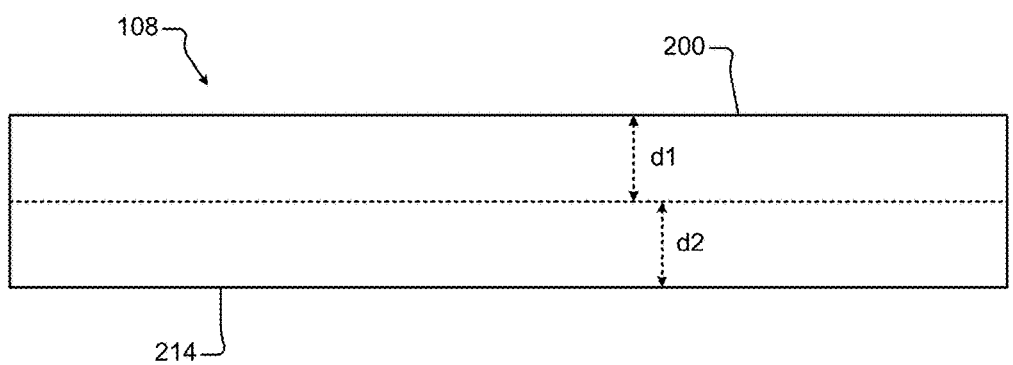
FIG. 3 is a plan view of the air-to-air CAC of FIG. 2 according to the present disclosure.

Referring now to FIGS. 2 and 3, the pitch of the turbulators can be varied in a transverse direction. In some examples, the turbulators may have a repeating structure such as an "S"-shaped cross-section, a "W"-shaped cross-section, other shaped cross-section or combinations thereof that define a pitch in a direction transverse to airflow though the tube assembly.

A first one of the tubes 108 includes a first transverse portion 200 with a first turbulator 210 having a pitch A. The first tube 108 further includes a second transverse portion 214 with a second turbulator 218 having a pitch B. The pitch A is different than the pitch B. In some examples, the pitch A is 0.5 to 3 times the pitch B, although other pitch values can be used. In some examples, the pitch A is from 0.5 to 6 and the pitch B is from 0.5 to 3.5, although other pitch values can be used.

In FIG. 3, the first transverse portion 200 extends a transverse distance d1 in a range from 25% to 70% of a width of the first tube 108 and the second transverse portion 214 extends a distance d2 in a range from 25% to 70% of the width of the first tube 108, respectively. In some examples, the first transverse portion 200 extends a distance d1 approximately 50% of a width of the first tube 108 and the second transverse portion 214 extends a distance d2 approximately 50% of the width of the first tube 108, respectively.

Figure 4:
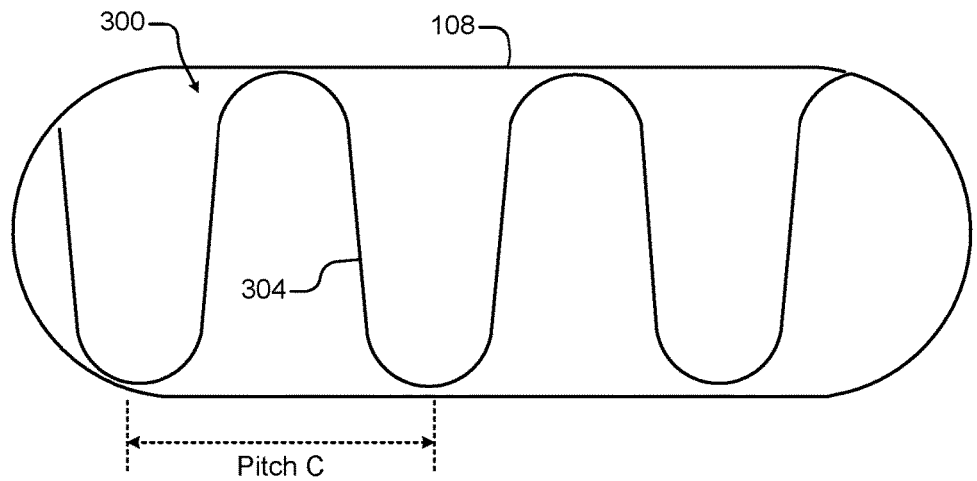
FIG. 4 is a cross-sectional view of an example of a second one of the tubes with a turbulator at a first longitudinal location with a first pitch according to the present disclosure.
Figure 5:
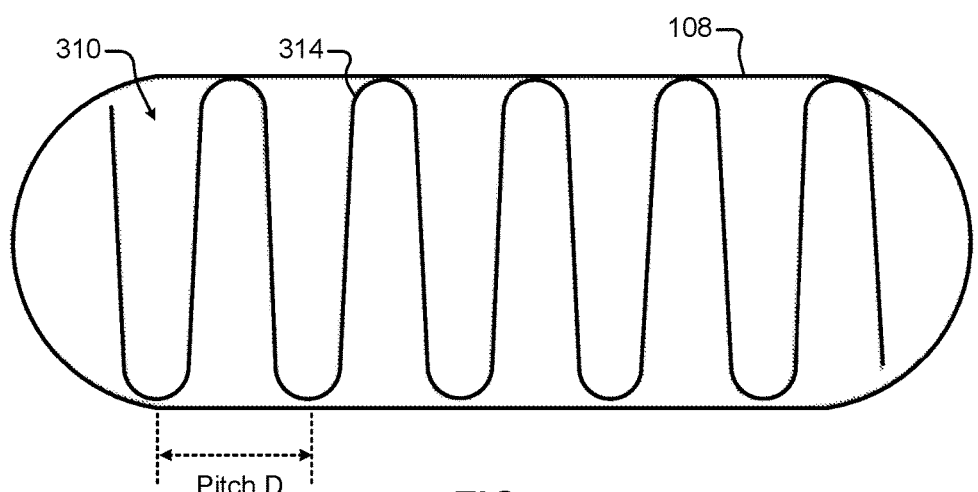
FIG. 5 is a cross-sectional view of an example of the tube of FIG. 4 at a second longitudinal location with a second pitch according to the present disclosure.
Figure 6:
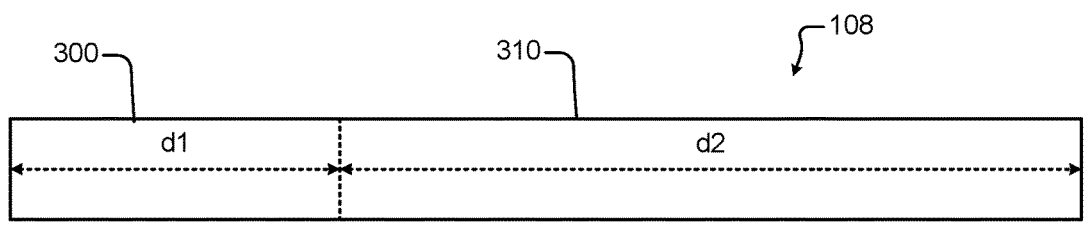
FIG. 6 is a plan view of the air-to-air CAC of FIGS. 4 and 5 according to the present disclosure.

Referring now to FIGS. 4-6, the pitch of the turbulators can be varied in a longitudinal direction. In FIG. 4, a first longitudinal portion 300 of a second one of the tubes 108 includes a third turbulator 304 having a pitch C. In FIG. 5, a second longitudinal portion 310 of the second tube 108 includes a fourth turbulator 314 having a pitch D. The pitch C is different than the pitch D. In some examples, the pitch C is 0.5 to 3 times the pitch D, although other pitch values can be used. In some examples, the pitch C is from 0.5 to 6 and the pitch D is from 0.5 to 3.5, although other pitch values can be used.

In FIG. 6, a first length d1 of the first longitudinal portion 300 can be varied relative to a second length d2 of the second longitudinal portion 310. As can be appreciated, additional longitudinal portions can be used. In some examples, the additional longitudinal portions have a different pitch than the first and second longitudinal portions 300 and 310, respectively. In other examples, additional longitudinal portions may have the same pitch as a non-adjacent one of the first or second longitudinal portions 300 or 310, respectively. In other words, an alternating pitch pattern can be used.

In some examples, the turbulators and the tubes are made of a heat conducting material. For example, the turbulators and the tubes are made of metal such as aluminum, steel or stainless steel, although other materials can be used. In some examples, longitudinal portions of the tubes and the turbulators having the same density can be made as single piece such as that shown in FIG. 3 or multiple pieces as shown in FIG. 4 (in other words the turbulator is inserted into the tube).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An air-to-air charge air cooler for cooling air supplied to an internal combustion engine, comprising:
a tube assembly including a plurality of tubes extending in a longitudinal direction,
wherein the plurality of tubes are arranged adjacent to one another, and
wherein each of the plurality of tubes includes an inlet to receive airflow and an outlet to output the airflow; and
a first turbulator and a second turbulator arranged in at least a first one of the plurality of tubes, each of the first and second turbulators having a pitch defined in a direction transverse to airflow through the first one of the plurality of tubes,
wherein the pitch varies in at least one of the longitudinal direction and the transverse direction of the first one of the plurality of tubes,
wherein the first turbulator has a first pitch and the second turbulator has a second pitch that is less than the first pitch,
wherein the first turbulator is arranged adjacent to the second turbulator in the transverse direction in the first one of the plurality of tubes, and
wherein the amount by which the second turbulator extends in the transverse direction is in a range from 25% to 75% of the width of the first one of the plurality of tubes.

2. The air-to-air charge air cooler of claim 1, wherein the first turbulator extends from the inlet to the outlet, and wherein the second turbulator extends from the inlet to the outlet.

3. The air-to-air charge air cooler of claim 1, wherein the first pitch is in a range from 0.5 to 3 times the second pitch.

4. The air-to-air charge air cooler of claim 1, further comprising a third turbulator and a fourth turbulator arranged in at least a second one of the plurality of tubes, wherein:
the third turbulator has a third pitch; and
the fourth turbulator has a fourth pitch that is different than the third pitch; and
the third turbulator is arranged adjacent to the fourth turbulator in the longitudinal direction in the second one of the plurality of tubes.

5. The air-to-air charge air cooler of claim 4, wherein the third pitch is in a range from 0.5 to 3 times the fourth pitch.

6. The air-to-air charge air cooler of claim 1, wherein at least a second one of the plurality of tubes includes:
a first longitudinal portion;
a second longitudinal portion;
a third turbulator having a third pitch arranged in the first longitudinal portion; and
a fourth turbulator that is arranged in the second longitudinal portion having a fourth pitch that is different than the third pitch.

7. The air-to-air charge air cooler of claim 6, wherein a first end of the first longitudinal portion is arranged adjacent to the inlet, a second end of the first longitudinal portion is arranged adjacent to a first end of the second longitudinal portion, and a second end of the second longitudinal portion is arranged adjacent to the outlet.

8. The air-to-air charge air cooler of claim 6, wherein the first pitch is in a range from 0.5 to 3 times the second pitch.

9. The air-to-air charge air cooler of claim 1, wherein the amount by which the second turbulator extends in the transverse direction is approximately 50% of the width of the first one of the plurality of tubes.

* * * * *